(12) United States Patent
Ninomiya et al.

(10) Patent No.: US 7,134,361 B2
(45) Date of Patent: Nov. 14, 2006

(54) FLYWHEEL AND MOUNTING METHOD FOR SAME

(75) Inventors: Hiroyasu Ninomiya, Fujisawa (JP); Susumu Tamura, Fujisawa (JP); Haruyo Kimura, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 173 days.

(21) Appl. No.: 10/185,368

(22) Filed: Jun. 27, 2002

(65) Prior Publication Data

US 2003/0005792 A1      Jan. 9, 2003

(30) Foreign Application Priority Data

Jul. 3, 2001    (JP) ............... 2001-202522

(51) Int. Cl.
*F02B 75/06*    (2006.01)
*F16F 15/22*    (2006.01)

(52) U.S. Cl. ............... 74/572.21; 123/54.4; 123/197.4

(58) Field of Classification Search .......... 74/572–574, 74/603, 604; 123/54.4–54.8, 197.4
See application file for complete search history.

(56) References Cited

U.S. PATENT DOCUMENTS

| | | | | |
|---|---|---|---|---|
| 2,474,370 A | | 6/1949 | Russell ............... 74/572 |
| 4,341,001 A | * | 7/1982 | Swartout ............ 29/894 |
| 4,765,198 A | * | 8/1988 | Stravrinidis ........ 74/572 |
| 4,784,006 A | * | 11/1988 | Kethley ............ 74/84 R |
| 5,000,141 A | * | 3/1991 | Sugano ............ 123/192.2 |
| 5,457,883 A | * | 10/1995 | Swenson, Sr. .......... 29/888.01 |
| 5,481,142 A | * | 1/1996 | James et al. .......... 310/51 |
| 6,166,472 A | * | 12/2000 | Pinkerton et al. ........ 310/208 |
| 6,216,327 B1 | | 4/2001 | Hendrian ............ 29/278 |
| 6,547,053 B1 | * | 4/2003 | Shih ............... 192/55.61 |

FOREIGN PATENT DOCUMENTS

| | | |
|---|---|---|
| GB | 2 114 709 A | 8/1983 |
| JP | 8-154357 A | 6/1996 |
| JP | 8-154357 A | 6/1996 |

OTHER PUBLICATIONS

Copy of EPC Search Report for Serial No. EP 02 01 4549 dated Jul. 11, 2003.

* cited by examiner

*Primary Examiner*—Chong H. Kim
(74) *Attorney, Agent, or Firm*—McCormick, Paulding & Huber LLP (57) ABSTRACT

In order to suppress axial vibration in a crank system, prevent knocking sound, and reduce vibration noise, a flywheel (1) which is mounted onto the crankshaft of an engine (E) is made into a spoked form having an uneven number of spokes (5). This prevents the symmetrical bending that occurs with an even number of spokes, and divides the vibration mode in the peripheral direction. It is preferable that the number of spokes be seven. The flywheel (1) is mounted such that, when the pistons of predetermined cylinders #5 and #6 are at top dead center at the start of the expansion stroke, one of the spokes (5*a*) is positioned on the opposing side to these predetermined cylinders, which border the center of the crank (C).

5 Claims, 11 Drawing Sheets

FIG.4a
5 TDC
CRANK PHASE

FIG.4c
6 TDC
CRANK PHASE

FIG.4b
FLYWHEEL PHASE

FIG.4d
FLYWHEEL PHASE

| NORMAL | MODE 1 | MODE 2 | MODE 3 | MODE 4 | MODE 5 | MODE 6 | MODE 7 |
|---|---|---|---|---|---|---|---|
|  | 507.3 Hz | 515.1 Hz | 515.4 Hz | 626.4 Hz | 628.2 Hz | 980.2 Hz | 990.3 Hz |

FIG.10b
PLAIN TYPE

FIG.10a
THE PRESENT EMBODIMENT

FIG.13

FLYWHEEL AND MOUNTING METHOD FOR SAME

CROSS REFERENCES TO RELATED APPLICATIONS

This application is entitled to the benefit of and incorporates by reference essential subject matter disclosed in Japanese Patent Application No. 2001-202522 filed Jul. 3, 2001.

BACKGROUND OF THE INVENTION

1. Field of the Invention

The present invention relates to an engine flywheel.

2. Description of the Related Art

An engine flywheel is mounted on the crankshaft of an engine, and functions as an inertial mass for reducing rotational variation in an engine. Conventionally, a simple circular plate, or in other words, a plain type flywheel, has generally been used as this type of flywheel.

However, when the present inventors coupled a plain type flywheel and an automatic transmission (AT) torque converter in a V6 engine and conducted tests on the engine during idling, a problem occurred in that a knocking sound was generated.

Figure 12:
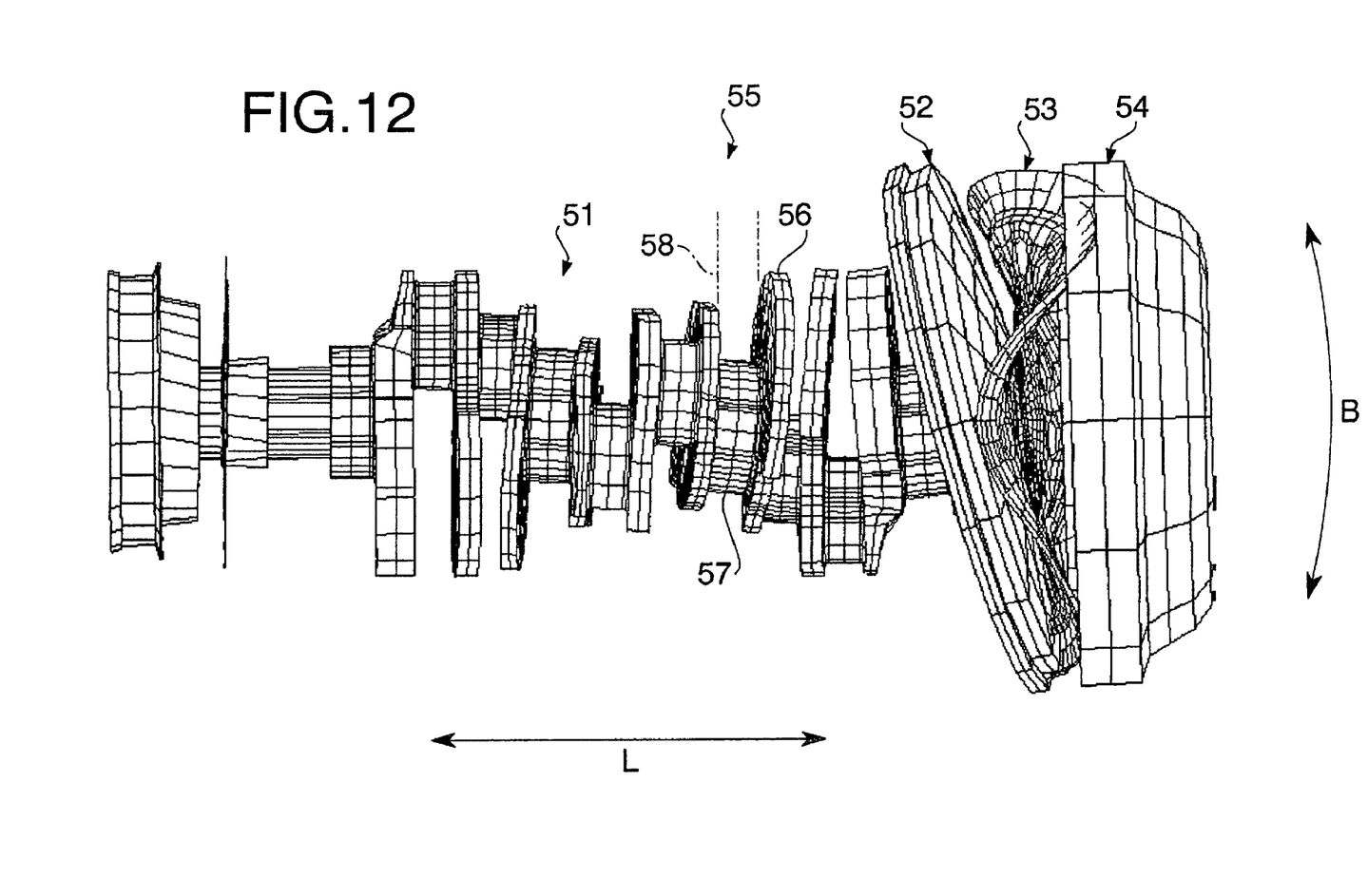
FIG. 12 is a view showing the deformation mode of a crank system.

More specifically, as is illustrated in FIG. 12, when the engine is driven, the crank system 55, comprising a crankshaft 51, flywheel 52, flexplate 53 and torque converter 54, rotates, generating bending vibration B which results in axial vibration L. At this time, the crank arm 56 and the like vibrate in an axial direction (thrust direction), colliding with the bearing 58 on the cylinder block side which supports the crank journal 57. The knocking sound is generated upon this collision, and becomes very unpleasant to the ear.

Figure 13:
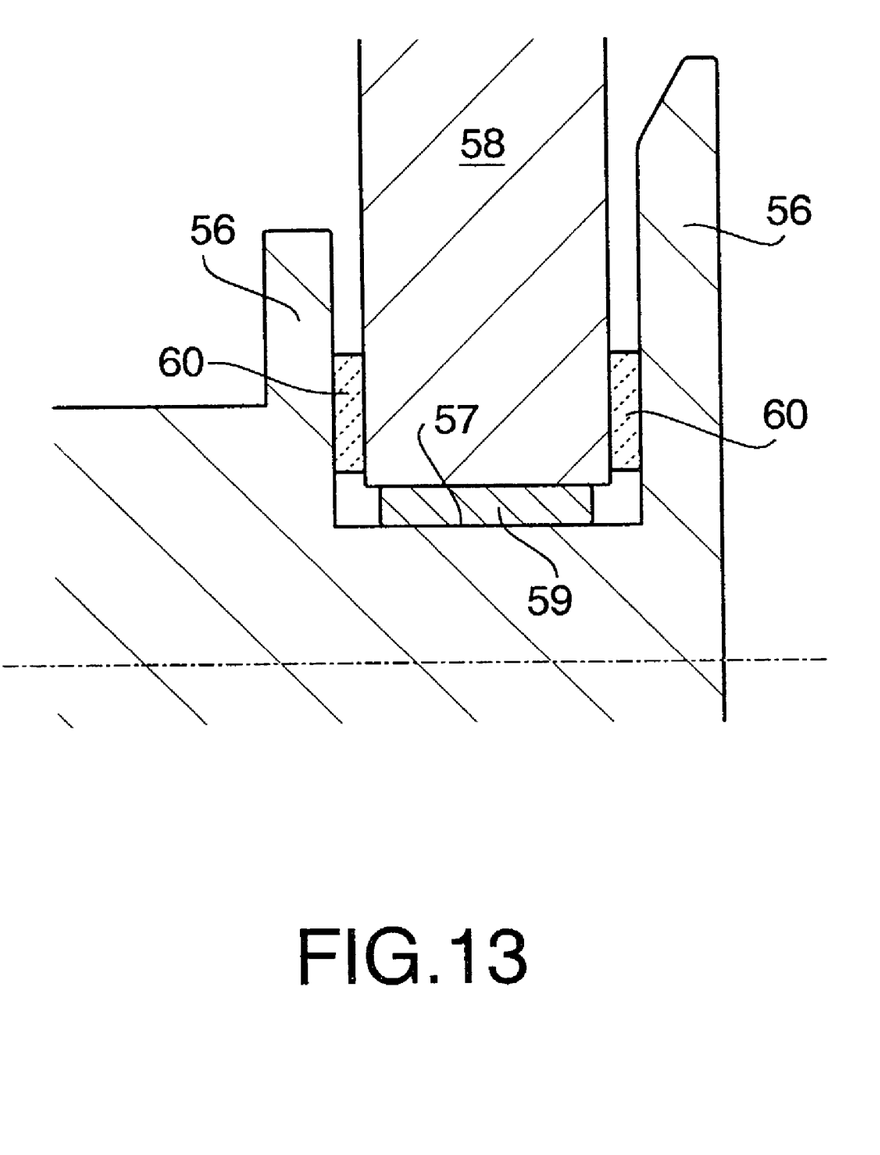
FIG. 13 is a sectional view of the crankshaft support section.

In more detail, as is illustrated in FIG. 13, bearing metal 59 and thrust metal 60 are integrally fixed to the bearing 58. The crank journal 57 is supported by the bearing metal 59 so as to be free to rotate, and the crank arm 56 is supported in the thrust direction by the thrust metal 60. There is a small gap between the crank arm 56 and the thrust metal 60, and accompanying the axial vibration of the crank system, the crank arm 56 vibrates within the range of this gap, thereby banging against the thrust metal 60 and generating a knocking sound.

In order to prevent this knocking sound, the bending vibration B and the resultant axial vibration L must be suppressed. To this end, a flywheel which is spoked to reduce the weight of the flywheel has been devised.

However, "spoked" has various formations, and not only can the utmost effects not be obtained by simply making the flywheel spoked, but conversely, the knocking sound may even be aggravated thereby.

SUMMARY OF THE INVENTION

The present invention has been devised in consideration of the aforementioned problems, and it is an object thereof to suppress axial vibration in the crank system, and thereby to effect a reduction in knocking sound and vibrating noise.

The present invention is a flywheel which is mounted onto the crankshaft of an engine, and which is spoked and has an odd number of spokes.

It is preferable that the number of spokes be seven. It is further preferable that the flywheel be attached to the crankshaft such that, when the pistons of predetermined cylinders in an engine are at top dead center at the start of the expansion stroke, one of the spokes is positioned on the opposing side to the predetermined cylinders, which border the center of the crank.

The present invention is also a method of mounting a spoked flywheel onto the crankshaft of an engine, wherein the flywheel is mounted such that, when the pistons of predetermined cylinders in an engine are at top dead center at the start of the expansion stroke, one of the spokes is positioned on the opposing side to the predetermined cylinders, which border the center of the crank.

BRIEF DESCRIPTION OF THE FIGURES

FIG. 2 is an enlarged view showing the lower half of FIG. 1a;

DESCRIPTION OF THE PREFERRED EMBODIMENTS

First, before describing a preferred embodiment of the present invention, the background to the development of the flywheel according to this embodiment will be explained.

The flywheel according to this embodiment was developed in order to be coupled with a V6 diesel engine and an automatic transmission torque converter. In order to reduce the weight of the flywheel, it was made with spokes. Here, if there is an even number of spokes, a deformation mode will arise in which the spokes bend symmetrically from the halfway point, and the deformation (vibration) on one side precipitates deformation (vibration) on the opposing side, which is undesirable. Thus, the number of spokes is made uneven such that each spoke is accorded independent deformation, thereby dispersing the [deformation] mode. This point will be explained later.

Figure 7:
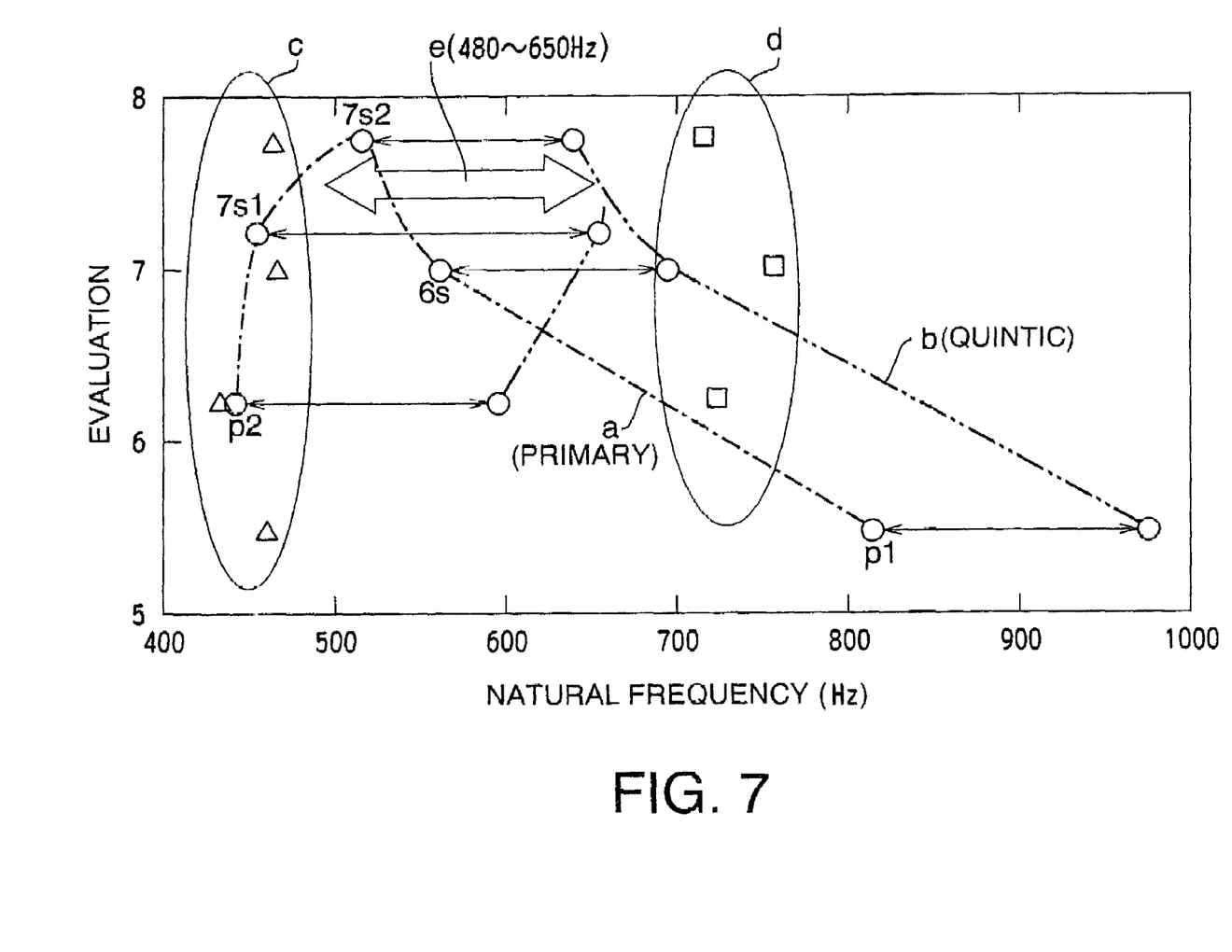
FIG. 7 shows the results of a preliminary study of the various flywheels.

FIG. 7 shows the results of a preliminary study which was performed prior to the actual manufacture of the flywheel. This graph expresses the relationship between the natural frequency (number of vibration) and an evaluation thereof. The "evaluation" indicates the results of a sensory evaluation, in which, on a maximum ten-point scale, the higher the value the better. Seven points was tentatively set as the qualifying standard. This graph was created entirely on the basis of the results of analysis.

◯ indicates data on the natural frequencies of individual flywheels, and Δ and □ indicate data on the natural frequencies of the crank system during actual operation. Specifically, Δ indicates the natural frequency of rear end bending in the crankshaft system, and □ is the coupled natural frequency of the bending and torsion of the crankshaft. The ◯ on the one-dot/dash line a is the natural frequency of the primary mode, and the ◯ on the two-dot dash line b is the natural frequency of the quintic mode. In other words, as the vibration mode rises from primary to quintic, the natural frequency of the individual flywheel changes from the one-dot dash line a to the two-dot dash line b.

The ◯ on the far lower right (marked p1) indicates data for a conventional plain type flywheel wherein the natural frequency is high and the evaluation is low. The ◯ on the far lower left (marked p2) is also a plain type flywheel, but one which is thin-walled and light. The natural frequency has become lower and the evaluation has risen, but still not sufficiently. The second ◯ from the left (marked 7s1) is a flywheel with seven spokes, and thus with reduced weight; the natural frequency is slightly higher than the thin-walled plain type flywheel, and the evaluation has improved further. The ◯ nearest the top (marked 7s2) is a further-improved seven-spoke flywheel in which natural frequency is higher again, and the evaluation has improved. The ◯ to the lower right thereof (marked 6s2) is a flywheel formed with six spokes, in which the natural frequency rises above that of the seven-spoke type, and the evaluation greatly deteriorates.

By investigating the causes of the differences in evaluation among various flywheels in this manner, it was learned that the natural frequency of the crank system during actual operation is closely related to these differences. That is, it was learned that a good evaluation is achieved when the range and amplitude of the primary to quintic natural frequencies of a flywheel do not become caught in the natural frequency area c of the rear end bending of the crankshaft system and the natural frequency area d of the coupled natural frequency of the bending and torsion of the crankshaft. To express this numerically, the primary to quintic natural frequencies of the flywheel should preferably fall within the optimum vibration frequency range of 480–650 Hz, which is illustrated by the outlined arrow e. In so doing, the natural frequencies do not coincide, preventing resonance and coupled vibration in the crank system, and preventing knocking sound in the vehicle.

As is illustrated in the graph, the primary natural frequencies of the thin-walled plain type flywheel p2 and the initial-type seven-spoke type flywheel 7s1 are caught within the lower area c, and the quintic natural frequency of the six-spoke type 6s is caught in the higher area d, and thus none of these flywheels can be said to show a good result. Conversely, all of the primary to quintic natural frequencies of the improved seven-spoke flywheel 7s2 fall within the optimum vibration frequency range of 480–650 Hz, thus achieving a good result.

As a consequence of the results of this study, the development of the seven-spoke type was advanced, resulting in the manufacture of the flywheel of this embodiment.

Figure 1A:
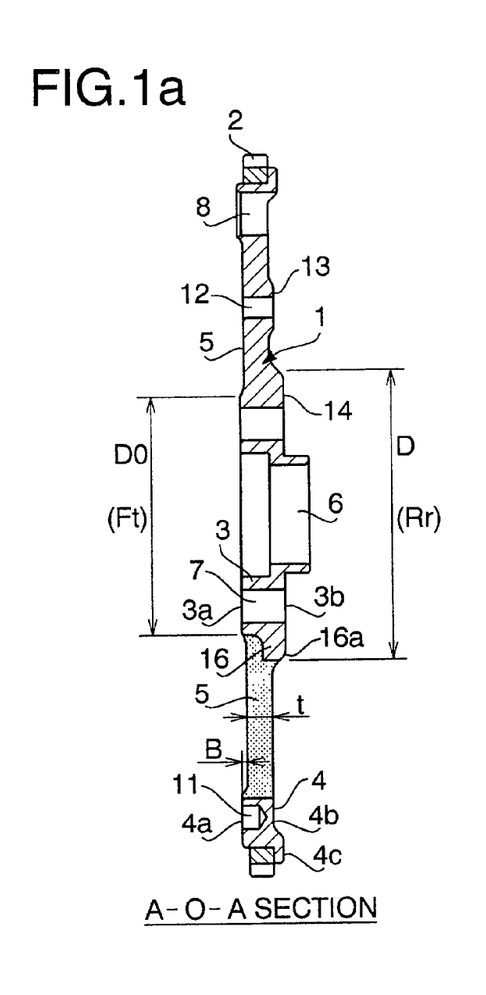
FIG. 1a shows the flywheel of the present embodiment being a longitudinal section side view thereof.
Figure 1B:
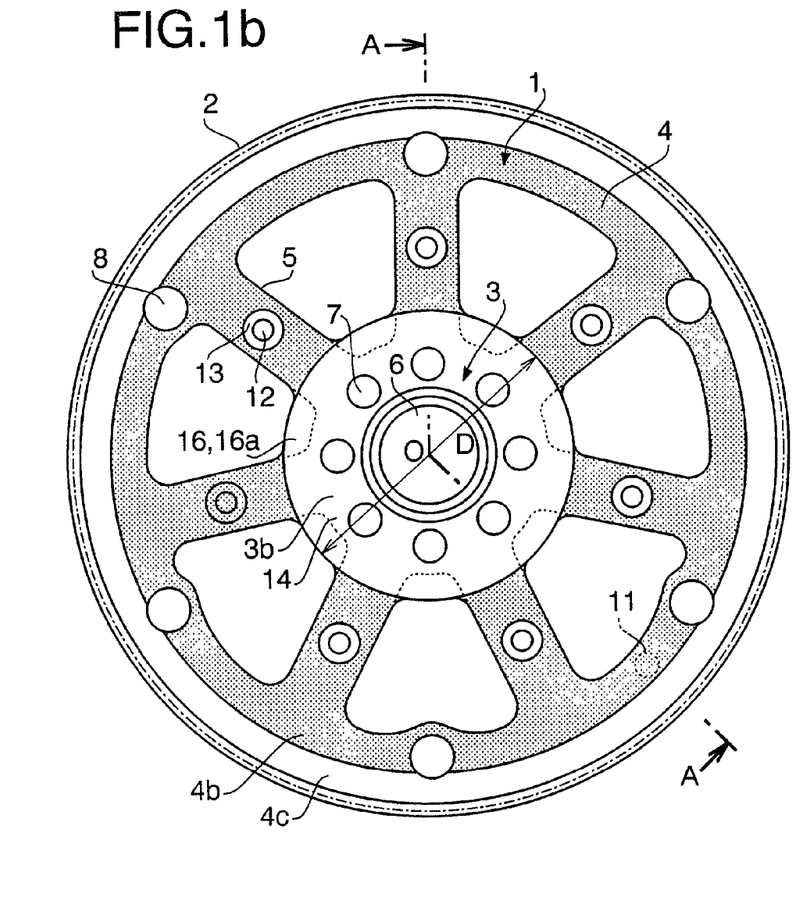
FIG. 1b shows the flywheel of the present embodiment being a back view thereof.
Figure 2:
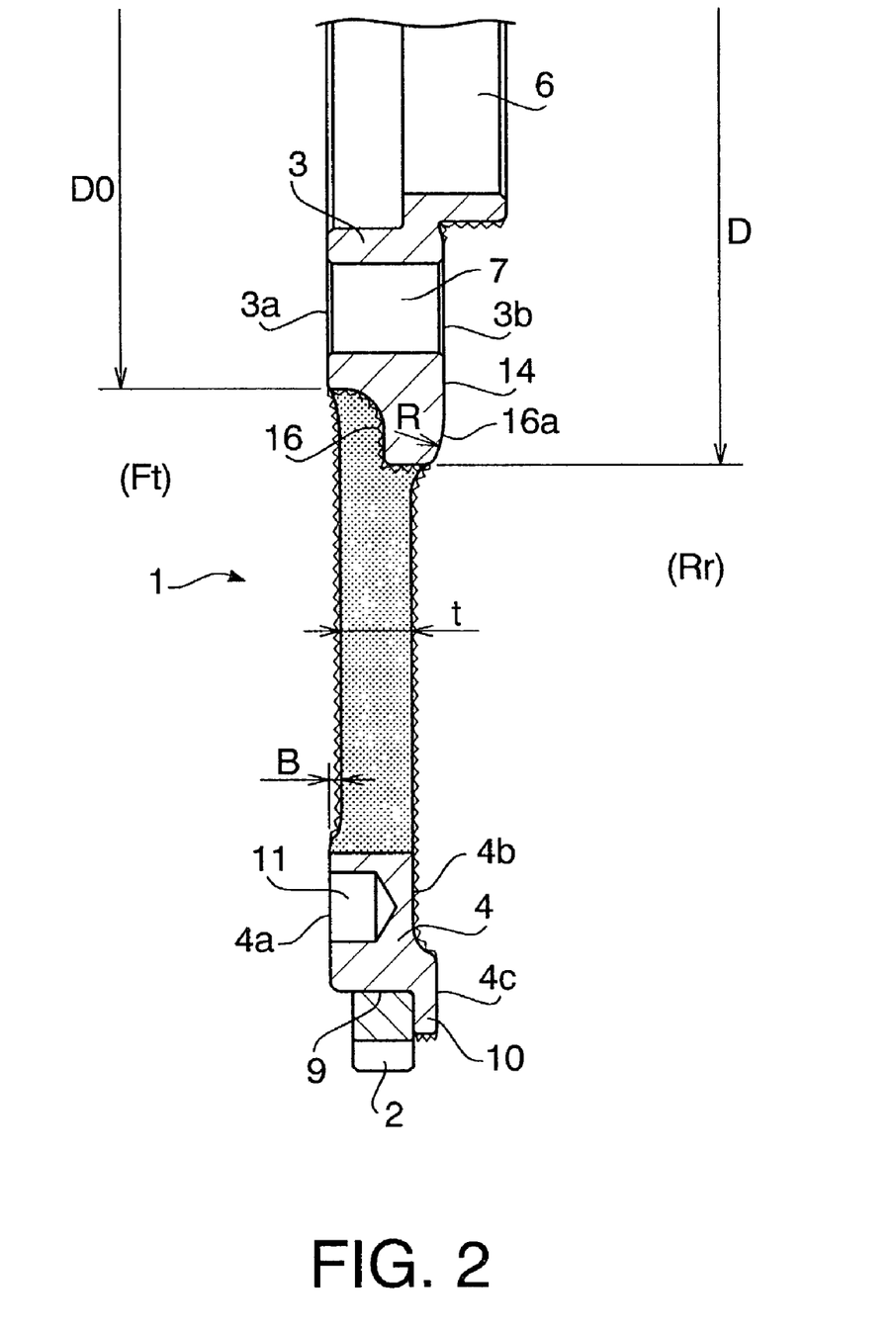

FIG. 1a, 1b show the flywheel of this embodiment, and FIG. 2 shows an enlargement of the lower half of FIG. 1a. Here, the form of the flywheel assembly is illustrated, in which a ring gear 2 is mounted on the outer circumference of a flywheel 1. The flywheel 1 is cast in one piece and has been subjected to a machine cutting process in places. The dotted pattern in FIGS. 1a, 1b and 2 and the narrow chevron pattern in FIG. 2 indicate the casting surfaces on which machine cutting has not been performed. This flywheel is mounted on a crankshaft which protrudes from the rear end of an engine, Ft indicating the front side near the engine, and Rr indicating the rear side away from the engine. The engine is a V6 diesel engine.

Figure 3:
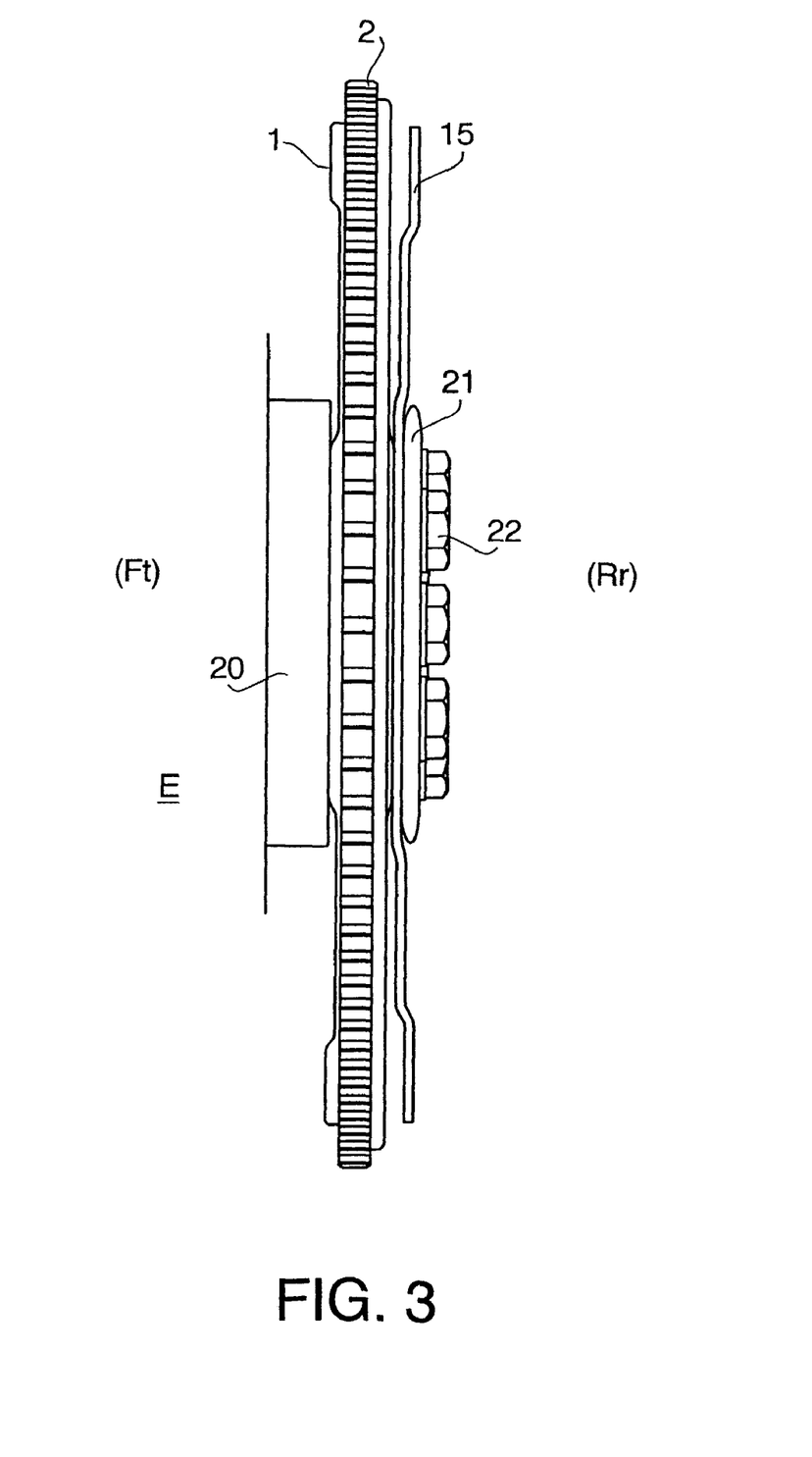
FIG. 3 is a side view showing the flywheel in its mounted state.

As is shown in FIG. 3, the crankshaft protrudes from the rear end of the engine E, and a flange 20 is mounted on the outer circumference of the crankshaft. A flywheel assembly and a flexplate 15 are coupled together and fixed in succession from the front by a plurality of bolts 22 via a washer 21 onto the rear surface of the flange 20. Then a torque converter (not shown) is mounted onto the rear of the flywheel assembly and the flexplate 15 in the axial direction so as to allow relative displacement.

Returning to FIGS. 1a, 1b and 2, the flywheel 1 is mainly constituted by an integral body comprising a central boss section 3 formed in the central section of the flywheel 1, an outer ring section 4 positioned on the outermost side in the diametrical direction, and a plurality of (seven) spokes 5 connecting the central boss section 3 and the outer ring section 4. The central boss section 3 serves as the section for mounting the flywheel onto the crankshaft, and therefore has a central stepped hole 6 for the insertion of a crankshaft, and a plurality of (eight) bolt holes 7 formed at equal spaces in the peripheral direction for inserting the aforementioned fastening bolts 22.

A plurality of (six) torque converter mounting tool holes 8 are provided at equal spaces in the peripheral direction, and these torque converter mounting tool holes 8 are for the insertion of bolts to mount a torque converter onto the flexplate 15. The entire front surface 4a of the outer ring section 4 is worked into a planar surface through a machine cutting process, and protrudes further forward than the front surface of the spokes 5 by a dimension B. On the rear surface 4b of the outer ring section 4, only one part 4c, which is on the outer side in the diametrical direction, is worked into a planar surface through a machine cutting process, and this part 4c protrudes further toward the rear than the other parts, the other parts having a casting surface which defines a continuous flat face with the rear surface of the spokes 5. On the outermost circumference of the outer ring section 4 are formed a press-in surface 9 for forcibly inserting a ring gear 2 and a back plate 10 for determining the position of the ring gear 2 in the axial direction. The press-in surface 9 and the front surfaces of back plate 10, or in other words, the contact face thereof, are smoothed by a machine cutting process. Further, a rotational balance-adjusting hole 11 is drilled to a predetermined depth in one location in the peripheral direction on the front surface 4a of the outer ring section 4.

The number of spokes 5 is uneven, and there are seven in this embodiment. These spokes 5 extend radially outward in the diametrical direction from the central boss section 3, and are disposed at equal angular spaces in the peripheral direction and have a cross section formed as a rectangle elongating in the peripheral direction. An adapter attaching hole 12 having a female screw is provided in an intermediate section in the longitudinal direction of each spoke 5. This is used to attach an adapter when conducting performance tests on individual engines on the production line. The adapter is attached from the rear, and thus the rear end circumference of the adapter attaching hole 12 protrudes slightly, and an attachment seat 13 is formed by a machine cutting process.

Here, the rear surface 3b of the central boss section 3 has a larger diameter than the front surface 3a, and a circular flexplate contact surface 14 is formed over the entire rear surface 3b. The flexplate contact surface 14 allows the flexplate 15 (see FIG. 3) to abut against or to seat on it, and is of course, therefore, smoothed by a machine cutting process. Note that the front surface 3a is also smoothed by a machine cutting process in order to allow contact with the flange 20 (see FIG. 3) on the crankshaft side. The flexplate 15 is interposed between the flywheel 1 and the torque converter T/C, thus preventing direct collisions and absorbing impact between the torque converter T/C and the flywheel 1 when the torque converter T/C vibrates in the axial direction. The outer circumference of the flexplate contact surface 14 is made into a rounded surface with a dimension r, and the flexplate 15 bends and returns to its original state along this surface, thereby producing a predetermined spring effect and damping effect. Furthermore, by rounding this surface, the flexplate 15 can be prevented from bending sharply, and fissures, damage and so on to the flexplate 15 can be prevented. The outer diameter of the flexplate contact surface 14 is D.

In order to form such a flexplate contact surface 14, webbed plate sections 16 are provided in the fork sections of the bases between all of the spokes 5. These plate sections 16 link the outer circumference of the central boss section 3 and the adjacent spokes 5 on both sides, and the rear surfaces 16a of the plate sections 16 form one part of the flexplate contact surface 14. The plate sections 16 are approximately half the front side to rear side thickness of the central boss part 3, and are positioned on the rear half of the central boss section 3. From the point of view of the spokes 5, the plate sections 16 are only disposed rearward from a substantially central position between the front side and the rear side of the spokes 5, and are not disposed along the entire front side to back side thickness t of the spokes 5.

Figure 8:
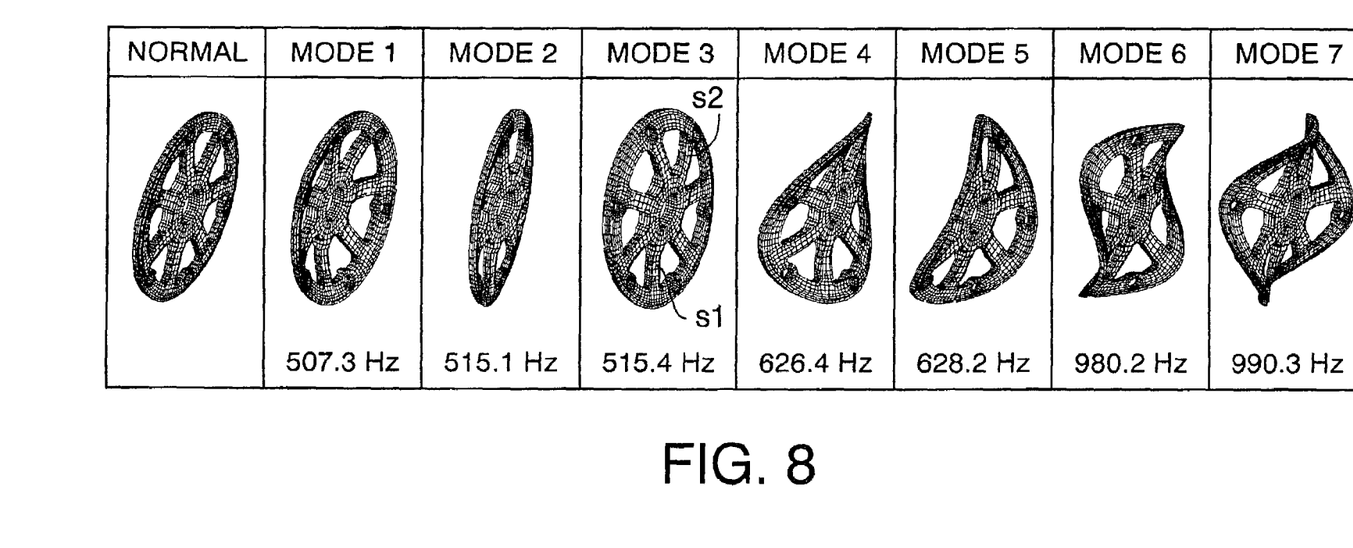
FIG. 8 is a perspective view showing the various deformation modes of the flywheel of this embodiment.

As for the features of this flywheel 1, firstly is the fact that there is an uneven number of spokes 5, and therefore the vibration mode can be divided and dispersed in an ideal fashion. FIG. 8 illustrates deformation in each vibration mode of the flywheel 1. "NORMAL" indicates a state of no deformation, whereas "MODE 1", "MODE 2". . . respectively indicate the states of deformation in the primary mode, secondary mode. . . The appended values indicate the natural frequencies of each mode, and as is illustrated in the figure, the natural frequencies of the primary to quintic modes, being from 507.3 Hz to 628.2 Hz, fall within the optimum vibration frequency range of 480–650 Hz.

Figure 9:
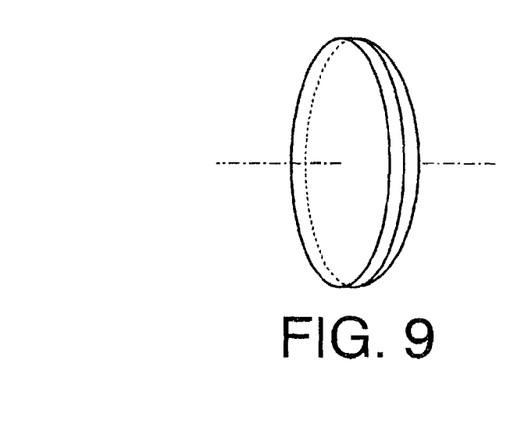
FIG. 9 is a perspective view showing the deformation mode of a conventional plain type flywheel.

In the tertiary mode, for example, the form of deformation varies between the s1 spoke and the s2 spoke. Dividing the vibration mode means causing different forms of deformation in each spoke, or in different positions in the peripheral direction, thereby making the vibration individual and independent in each spoke. Conversely, when there is an even number of spokes, deformation occurs in which the flywheel bend symmetrically from a halfway position, and one deformation triggers another deformation, thereby precipitating mutual vibration. As a result, the amplitude of the vibration increases throughout the entire flywheel, causing an increase in the axial vibration of the crankshaft. As illustrated in FIG. 9, with a conventional plain type flywheel, symmetrical bowl-shaped deformations occur in the center of the flywheel and gradually become worse. For this reason, it is preferable that the flywheel be comprised of an odd number of spokes.

In this embodiment an example is given with seven spokes. However this does not mean that the number of spokes is limited to seven.

Figure 4A:
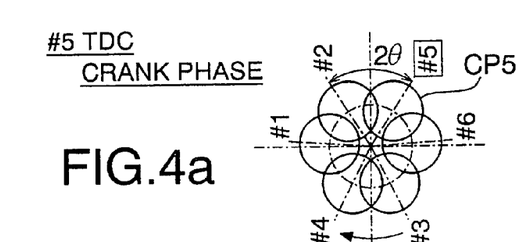
FIG. 4a shows the crank phase when the piston in the cylinder #5 is positioned at TDC.
Figure 4B:
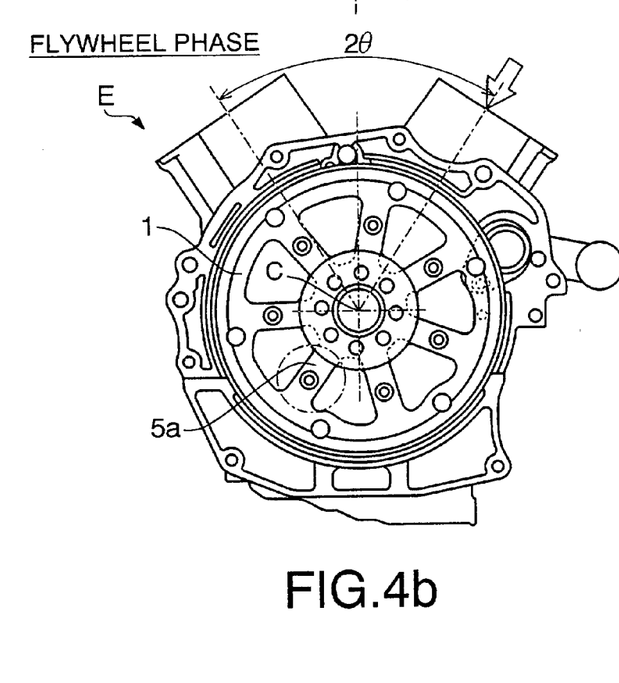
FIG. 4b shows the flywheel phase when the piston in the cylinder #5 is positioned at TDC.
Figures 4C, 4D:
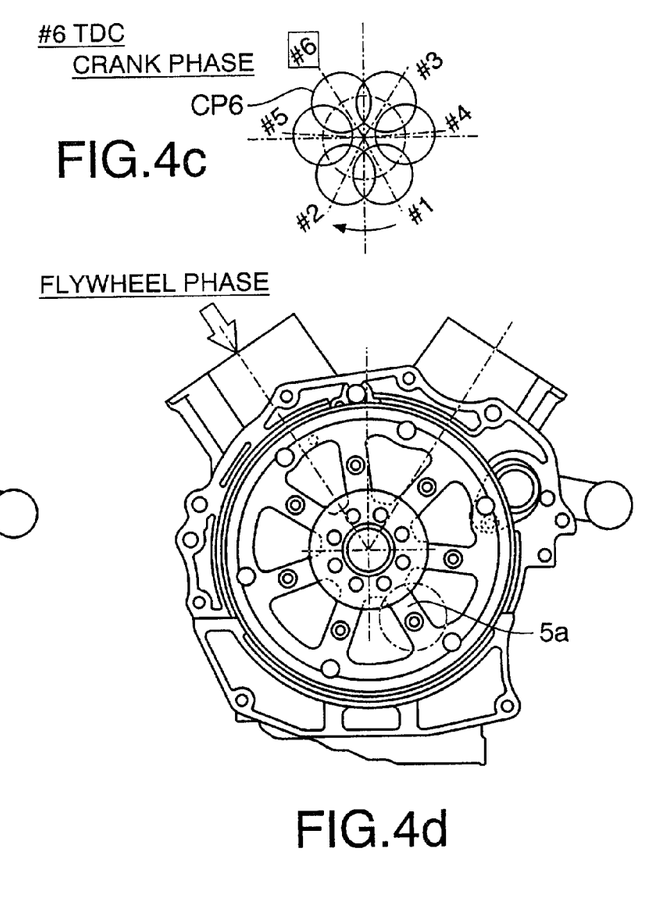
FIG. 4c shows the crank phase when the piston in the cylinder #6 is positioned at TDC.
FIG. 4d shows the flywheel phase when the piston in the cylinder #6 is positioned at TDC.
Figure 5:
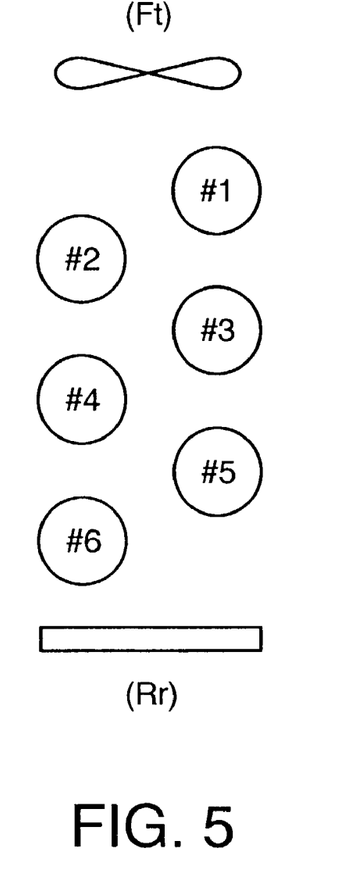
FIG. 5 is a schematic top view showing the cylinder arrangement.

The mounting method of the flywheel 1 will now be explained. FIG. 4b, 4d show a flywheel 1 which is mounted in a V6 engine E, and is a view of the engine E as seen from the rear. FIG. 4a, 4c show the positions of the crank pins and the direction of engine rotation in the cylinders #1, #2 . . . #6. FIG. 4a corresponds to FIG. 4b, and FIG. 4c corresponds to FIG. 4d. FIG. 5 is a pattern diagram of the engine as seen from above, showing the arrangement of the cylinders #1, #2. . . #6. The angle of bank of the engine 2θ is equal to 66°.

When testing the mounting of the flywheel 1 during the early stages of development, a test was performed following mounting. The flywheel 1 was then removed and remounted and a further test was performed, whereupon a situation arose in which the previous satisfactory results worsened. Having investigated the causes of these different test results, it was found that there is an optimum phase for mounting the flywheel 1. This is also related to the generation of vibration in the crank system in synchronization with the cycle of combustion (explosion) of the engine. Through trial and error, it was learned that the optimum mounting method is that illustrated in FIG. 4b, 4d.

Namely, when the pistons of cylinders #5 and #6 in the engine E are at top dead center TDC at the start of the expansion (combustion) stroke, one of the spokes 5 is positioned on the opposing side to cylinders #5 and #6 which border the center of the crank. FIG. 4a, 4b are an example of cylinder #5, and FIG. 4c, 4d are an example of cylinder #6.

In FIG. 4a, 4b, the piston of cylinder #5 is at top dead center TDC at the beginning of the expansion (combustion) stroke. This is understood in FIG.4a from the fact that the crank pin CP5 of cylinder #5 is on the central line in the right bank. At this time, as illustrated in the lower drawing, one spoke 5a is positioned on the opposing side to cylinder #5 which borders the center of the crank C. The spoke 5a lies substantially along the right bank or the central line of cylinder #5, and lies substantially in the direction (indicated with the outlined arrow) of the combustion or expansion stroke of the piston in cylinder #5. The same can be said for cylinder #6 shown in FIG. 4c, 4d. By employing such a method of mounting as the above, with the two rearmost left and right cylinders as the reference, the effect of reducing vibration noise and preventing knocking sounds can be ensured.

The flywheel of this embodiment is spoked, and therefore differences in the response vibration of the flywheel, which is in response to the input vibration of a certain direction of bending, are produced according to the mounting phase of the flywheel. By employing the aforementioned method of mounting, the response vibration of the flywheel in response to bending vibration generated in an actual engine is optimized, thereby minimizing the amplitude of the vibration in the flywheel and reducing axial vibration in the crank.

The plate section 16 will now be explained. The flexplate contact surface 14 is formed in the rear of the flywheel 1 of this embodiment. Since the partnering flexplate 15 is predetermined, the shape and dimensions (such as the outer diameter D or the dimensions of the rounded part r) of the flexplate contact surface 14 cannot be modified. Meanwhile, the dimensions (such as length, front side to rear side thickness and width) of the spokes 5 are determined with the vibration characteristic as the main consideration, and hence cannot be modified either.

In the flywheel 1 of this embodiment, the outer diameter D of the flexplate contact surface 14 is larger than the outer diameter D0 of the base of the spokes 5, or n other words, the central boss section 3. In this case, if the form of the base of the spokes 5 is given priority and the plate section 16 completely excluded, then the flexplate contact surface 14 becomes grooved rather than uniformly circular, causing a deterioration in the contacting ability of the flexplate 15 and reducing the fatigue strength of the flexplate 15. On the other hand, if the flexplate contact surface 14 is given priority and the plate section 16 is provided over the entire front-to-rear width, the length of the spokes 5 becomes substantially shorter, affecting the vibration characteristic. In other words, rigidity increases, and hence the natural frequency rises to the extent that it no longer falls within the optimum vibration frequency range of FIG. 7. If the thickness t of the spokes 5 is reduced in order to lower the rigidity, maintaining the burst strength is no longer possible. Note that the burst strength indicates strength as measured by the number of high speed revolutions the flywheel can withstand before breaking, and in this embodiment is 10000 rpm.

Consequently, a plate section 16 such as that described above is provided as a compromise. By means of the plate section 16, an ideal flexplate contact surface 14 can be ensured, and since the plate section 16 is thinner than the front side to rear side thickness t of the spokes 5, the vibration characteristic undergoes no great damage even when the plate section 16 is added to the base sections of the spokes 5. Note that analysis was conducted for a flywheel provided with the plate section 16 and satisfactory results could be obtained.

The plate section is designed so as to have no effect on the vibration characteristic of the flywheel, and as a reinforcing member for the base sections of the spokes, and is therefore suitable for every spoked flywheel.

The outer ring section 4 will now be explained. The flywheel 1 of this embodiment is basically cast and the spoke 5 parts are left unchanged after casting with a casting surface on the surface thereof. In this case, an irregularity in the front side to rear side thickness t of the spokes 5 of ±1 mm occurred upon manufacture, and it was learned that the natural frequency range varies among the primary to quintic modes of the flywheel 1 due to this irregularity. According to the results of an investigation, the variation in the vibration frequency range in response to a 1 mm variation in the front side to rear side thickness was approximately 40 Hz. If the vibration frequency range undergoes large variations and becomes unable to fall within the optimum vibration frequency range of FIG. 7, then the product cannot be marketed. On the other hand, if supervision is tightened in order to recognize this problem, then control costs rise, and if processes are altered to suppress the the irregularities in dimensions, then product costs rise.

As a result, a problem arose to reduce the margin (range) of variation of the natural frequency range in relation to irregularities in the front side to rear side thickness t, or in other words, to dull sensitivity of the natural frequency to irregularities in relation to irregularities in the front side to rear side thickness of the spokes, and trial and error tests were repeated.

Figure 6:
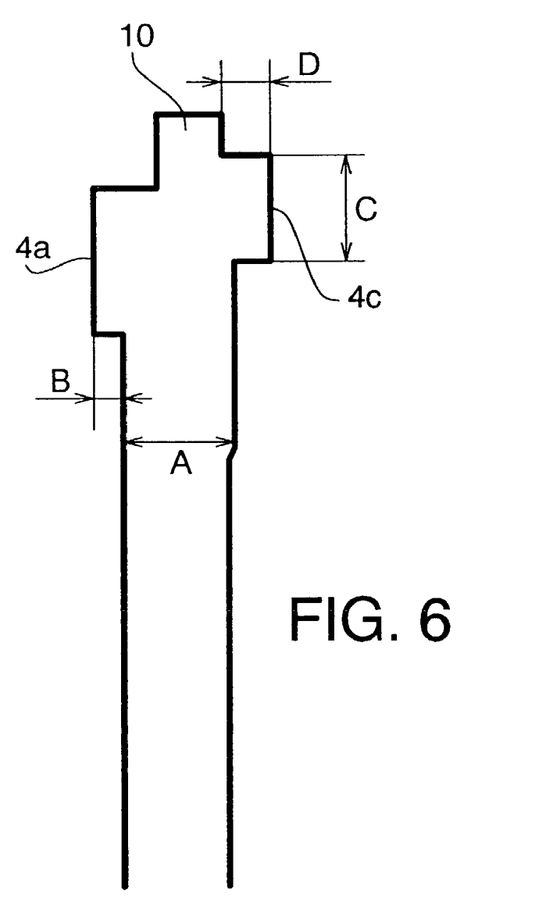
FIG. 6 is a schematic side view showing the various dimensions of the outer ring section.

After altering the dimensions of the outer ring section 4 and conducting analysis, it was learned that the protruding amount B of the front surface 4a has a great effect upon the sensitivity of the natural frequency to irregularities. In other words, as shown in FIG. 6, after making various alterations to the protruding amount B of the front surface 4a, the width C in the diametrical direction of the machine processed part 4c of the rear surface 4b, and the width D from this machine processed surface to the front surface of the back plate 10, it was learned that dimension C and dimension D have little effect upon the sensitivity to irregularities, whereas dimension B has a large effect upon the sensitivity to irregularities. Accordingly, by altering the amount of machine cutting on the front surface 4a, and by altering dimension B, the margin of variation of the natural frequency range in relation to irregularities in the front side to rear side thickness t of the spokes can be modified.

It was also learned that in order to reduce the margin of variation, the dimension B should be made as small as possible. To take as an example a case in which an irregularity of ±1 mm arises in the front side to rear side thickness t of the spokes 5, when dimension B=2.0 mm, the natural frequency range of the primary to quintic modes of the flywheel 1 is 470–643 Hz, and the margin of-variation thereof is 173 Hz; however when dimension B=0 mm, the natural frequency range of the primary to quintic modes of the flywheel 1 is 475.8–629.7 Hz, and the margin of variation thereof is 153.9 Hz. These are reductions when compared with a case in which dimension B=3.6 mm. Accordingly, it is best to make dimension B=0 mm, that is, to set the protruding amount B of the front surface 4a to zero,.

However, the present embodiment does not conform to this. As is shown in FIGS. 1a and 2, B=2 mm in this embodiment. If this is set to zero further improvements can be effected. Incidentally, in FIG. 6 in this embodiment, dimension D is 3.6 mm and dimension C is 6.5 mm.

FIGS. 10a, 10b and 11a, 11b show the results of actual noise tests. In these tests, a flywheel and a torque converter were actually assembled on an engine and the engine was driven to measure the noise. The black pattern in the figure illustrates the acoustic pressure level, and as this pattern becomes larger, the acoustic pressure rises.

Figure 10A:
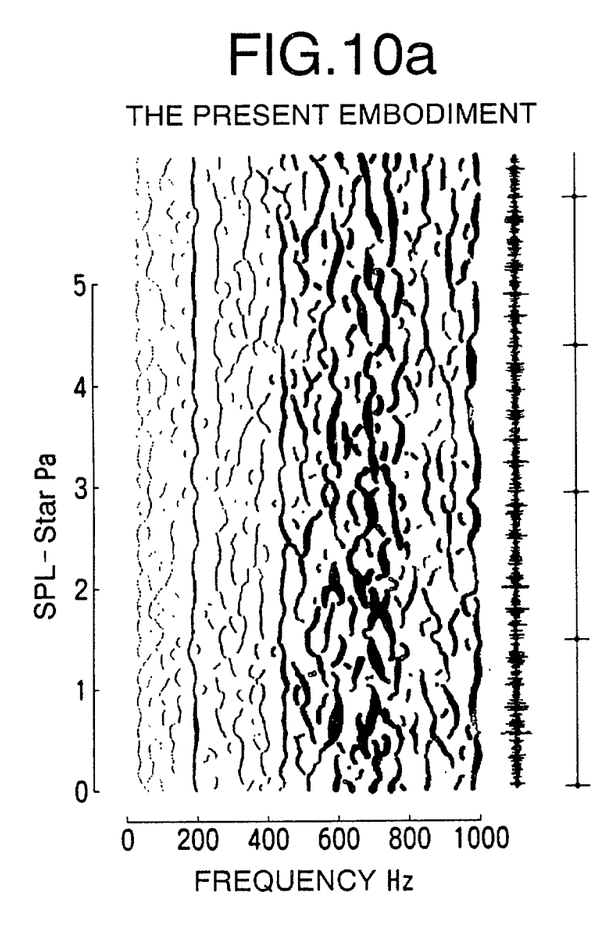
FIG. 10a, 10b shows the results of a comparative noise test between this embodiment and a conventional plain type flywheel.
Figure 10B:
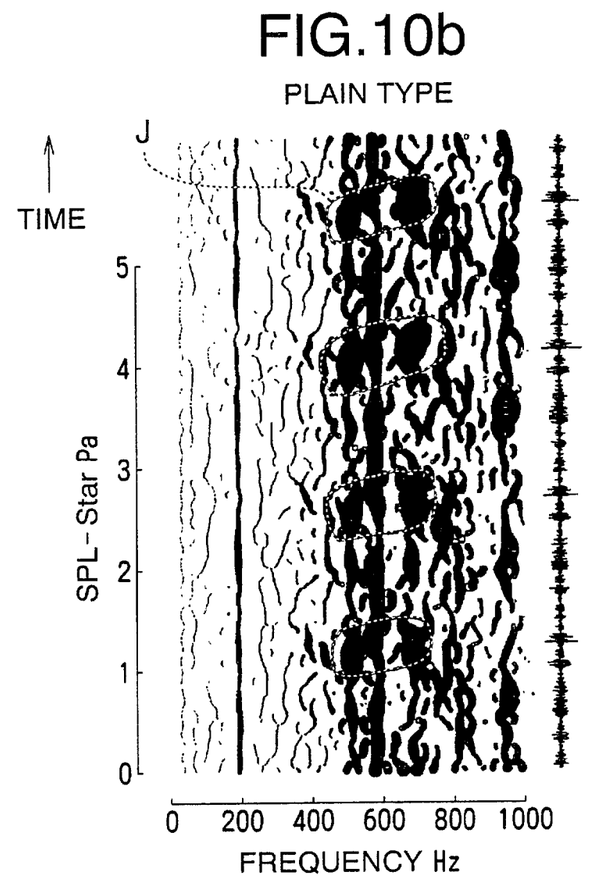

FIG. 10a, 10b show a comparison of the flywheel 1 of this embodiment (FIG. 10a) and a conventional plain type flywheel (FIG. 10b). As shown by the circular line J in FIG. 10b, a potato-shaped pattern appears periodically, and this is knocking sound. Meanwhile, as shown in FIG. 10a, no knocking sound is generated in the flywheel 1 of this embodiment. The excellence of the flywheel 1 of this embodiment can be understood from this.

Figure 11A:
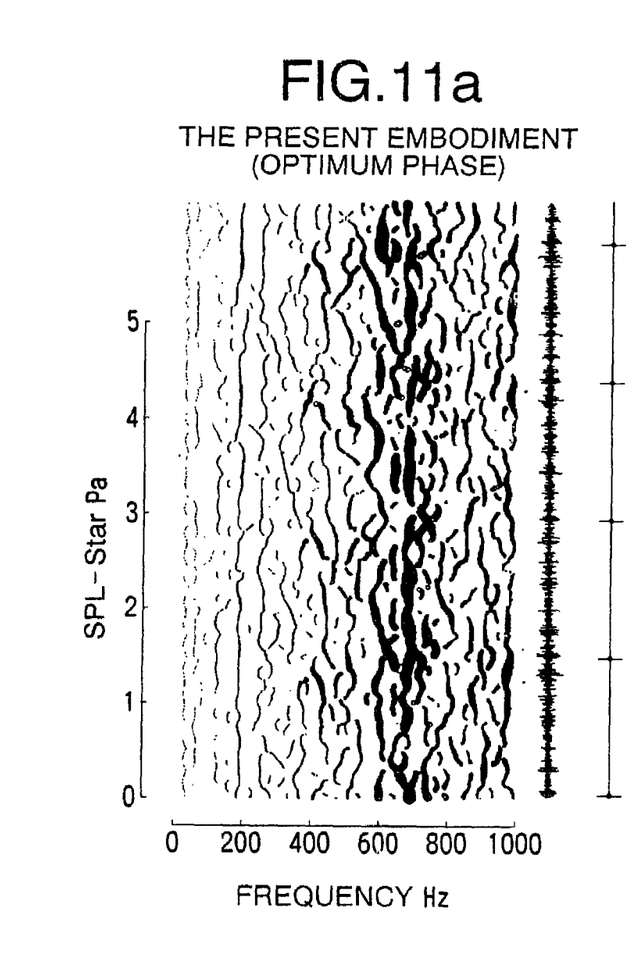
FIG. 11a, 11b shows the results of a comparative noise test between the mounting method of this embodiment and a mounting method at a different phase.
Figure 11B:
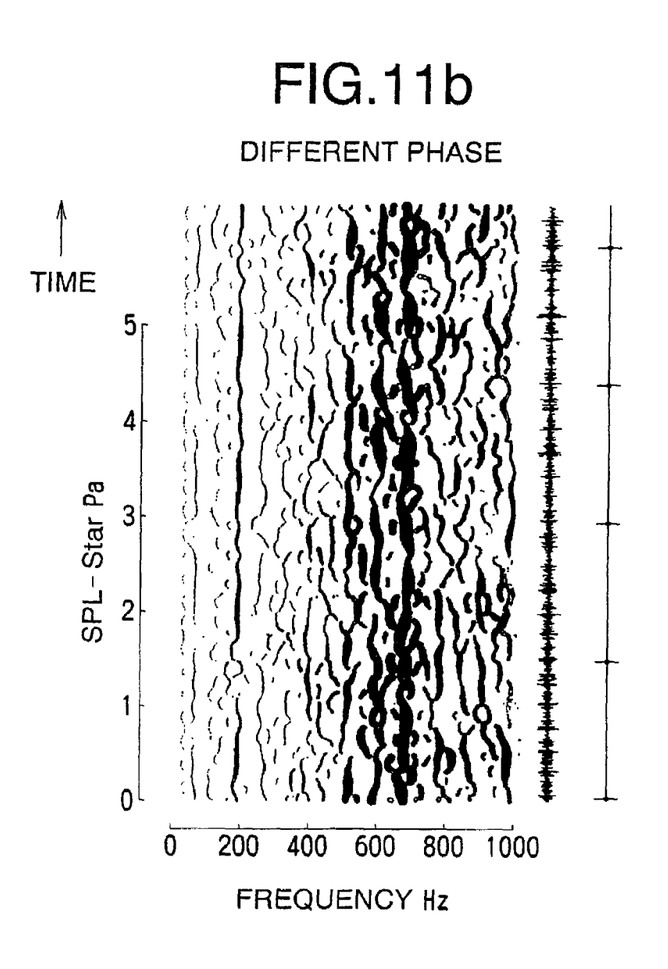

FIG. 11a, 11b show a comparison between a case in which the flywheel 1 of this embodiment is mounted in an engine E at the optimum phase as shown in FIG. 4 (FIG. 11a), and a case in which the flywheel 1 is mounted at a different phase (FIG. 11b). As can be understood from the drawings, FIG. 11a has fewer black patterns than FIG. 11b, and hence overall acoustic pressure is lower. The excellence of the mounting method of the flywheel of this embodiment can be understood from this.

The embodiments of the present invention are not limited to that described above, and various other embodiments can be considered. For example, the engine is not limited to a V6 diesel engine, and may be of any type (L4, V8, gasoline etc.). The number of spokes may also be modified to conform with the engine system. For example, a V8 engine may have 9 spokes. In the aforementioned V6 engine, the flywheel mounting phase was determined with cylinders #5 and #6 as the reference, but in cases where other cylinders would be best as the reference, this is acceptable.

To summarize, according to the present invention as described above, the following outstanding effects are demonstrated.

(1) The flywheel is produced in an optimum spoke-form.
(2) Axial vibration in the crank system is suppressed, knocking sound is prevented, and vibration noise is reduced.

What is claimed is:

1. An engine assembly comprising:
    an engine having pistons associated with cylinders;
    a crankshaft; and
    a flywheel having an uneven number of spokes,
    wherein the flywheel is mounted on the crankshaft such that a spoke is substantially in alignment with, and opposed to, a predetermined one of the cylinders when the piston associated with the predetermined cylinder is at top dead center at the start of an expansion stroke.

2. The assembly according to claim 1, wherein the number of said flywheel spokes is seven.

3. A method for mounting a spoked flywheel onto the crankshaft of an engine, the engine having pistons and cylinders, the method comprising the steps of:
    placing said flywheel on the crankshaft;
    orienting a spoke of said flywheel substantially in alignment with, and opposed to, a first predetermined cylinder when the piston of a first predetermined cylinder is at top dead center at the start of the expansion stroke.

4. The assembly of claim 1, wherein the engine is a V-6 engine and the predetermined cylinder is the cylinder closest to the flywheel.

5. The assembly of claim 1, wherein the flywheel is mounted on the crankshaft such that a second spoke is substantially in alignment with a second predetermined one of the cylinders when the piston associated with the second predetermined cylinder is at top dead center at the start of an expansion stroke.

* * * * *